United States Patent Office 3,173,754
Patented Mar. 16, 1965

3,173,754
SEPARATION OF MOLYBDENUM FROM TUNGSTEN VALUES
Charles R. Kurtak, Bishop, Calif., assignor to Union Carbide Corporation, a corporation of New York
No Drawing. Filed Sept. 19, 1962, Ser. No. 224,827
4 Claims. (Cl. 23—22)

This application is a continuation-in-part of application S.N. 831,715, filed August 5, 1959, by C. R. Kurtak, and now abandoned.

The present invention relates to a method of selectively removing molybdenum from molbdenum-contaminated aqueous tungsten-bearing solutions.

In the normal operation of a tungsten mill, metal values are processed through a physical concentration section and a chemical section. In the physical concentration section, the ore, which may contain about 0.5 weight percent tungsten along with small amounts of contaminants such as molybdenum, is concentrated to a fraction containing about 10.0 weight percent tungsten. During concentration of the tungsten ore, contaminants such as molybdenum, are also concentrated. This intermediate fraction or ore concentrate then goes to the chemical section where it is digested under pressure in hot sodium carbonate solution to leach the tungsten values from the ore. During leaching of tungsten values, virtually all of the molybdenum is leached from the ore. A large excess of sodium carbonate over the stoichiometric requirement is normally used to insure rapid and complete dissolution of the metal values. The resulting leach liquor is filtrated to remove entrained insoluble calcite and siliceous material. The leach liquor from this operation is then treated with calcium chloride and tungsten is precipitated as calcium tungstate, or synthetic sheetlite, which becomes the normal shipping product of the mill. This calcium tungstate product must invariably be treated further to remove molybdenum before it can be used as a starting material in the preparation of high purity tungsten.

An alternative method of producing tungsten in a form amenable for use in commercial products employs solvent extraction techniques, particularly amine organic solvent extraction techniques, rather than the aforementioned multiple precipitation technique. The solvent extraction technique is highly efficient and will selectively separate tungsten from several contaminants such as sodium, aluminum and phosphorus but tungsten cannot be selectively separated from molybdenum by an amine solvent extractant.

It is an object of the present invention to provide a process for selectively removing molybdenum from a molybdenum contaminated aqueous tungsten bearing solution.

It is another object to provide a process for selective removal of molybdenum from tungsten bearing liquors destined for treatment to remove tungsten therefrom by amine organic solvent extraction techniques.

The process satisfying the aforementioned objects comprises providing a molybdenum contaminated aqueous solution of tungsten values; adjusting the pH of the aqueous solution to at least 8 or higher; adding to the aqueous solution at least 170 percent of the amount of alkali sulfide stoichiometrically required to convert the molybdenum contaminant in the solution to the thiomolybdate complex ion; digesting the solution at an elevated temperature until substantially all molybdenum contaminants are converted to the thiomolybdate complex ion; acidifying the digested solution until the pH of the solution is below about 3.0 whereby the molybdenum contaminant is precipitated as insoluble molybdenum trisulfide and separating the precipitate from the molybdenum-free solution.

Starting feed solutions for treatment in the present integrated process may be prepared by standard known methods as for example those resulting from the treatment of scheelite ores. Tungsten primarily occurs in commercial quantities, i.e. as an ore, as the mineral scheelite. The scheelite ore is first treated by physical concentration techniques starting with grinding and classifying followed by flotation to upgrade the tungsten content from about 0.5 percent tungsten to about 10.0 percent tungsten. At this point the ore is highly contaminated with molybdenum as well as some phosphorous and fluorine.

The concentrate from the physical concentration section is then passed to a chemical treatment section. The scheelite here is first digested under pressure in a concentrated sodium carbonate solution to leach out the tungsten values. During leaching of tungsten from the scheelite ore, molybdenum as well as sodium fluoride, copper, aluminum and phosphorus are also leached from the ore. The leach liquors typically analyze 110 grams/liter of $WO_3$, 4.5 grams/liter Mo, 120 grams/liter of $Na_2CO_3$, 1.5 grams/liter of $SiO_2$ and 3.75 grams/liter of F.

The leach liquors generally range in pH from about 10.5 to about 11.0. Accordingly it may not be necessary to adjust the pH at all prior to addition of the alkali sulfide in the molybdenum removal step when the starting liquor results from a sodium carbonate leach of the starting ore. The treatment of the starting scheelite ore by physical and chemical beneficiation techniques to form the starting leach liquors are generally well known in the art.

At this point the leach liquor is treated by the process of the present invention.

In the foregoing description of the present molybdenum removal process, it was stated that the pH of the molybdenum contaminated alkaline solution of tungsten values should be at least 8 prior to precipitation of molybdenum. This represents the lowest degree of alkalinity which is tolerable in the integrated process of the present invention. If the pH is permitted to fall below 8 a complete conversion of the molybdenum contaminant to the thiomolybdate complex ion is not achieved and incomplete precipitation of the molybdenum contaminant results. Most satisfactory results are obtained when the pH is greater than 10.

It was also previously stated that the digestion of the sulfide treated solution should be effected at an elevated temperature. The lower the temperature is during digestion, the longer the period of time necessary to obtain the essential thiomolybdate complex ion which is represented by the formula $MoC_4^=$. Preferably the digestion should be performed at a temperature in excess of 80° C. Digestion at a temperature of about 85° C. for about one hour has been found to be quite satisfactory.

The reagent which is employed for treating the alkaline solution of tungsten values is an alkali sulfide. Included within this term are sodium sulfide ($Na_2S$), sodium acid sulfide (NaHS), potassium sulfide ($K_2S$) and potassium acid sulfide (KHS).

To illustrate the importance of employing 70 percent in excess of the stoichiometric amount of the alkali sulfide required to cause formation of the thiomolybdate complex ion (i.e. 170 percent of the theoretical requirement) a series of tests were performed under substantially identical conditions except that the amount of excess sodium acid sulfide over and above that theoretically required to cause formation of the thiomolybdate complex ion was varied. After treatment with the alkali sulfide, the solutions were treated with sulfuric acid to lower the pH below about 2.3 and to eventually precipitate molybdenum as a molybdenum trisulfide in the manner described previously. The amount of molybdenum and tungsten remaining in the solution after precipitation and separation of the molybdenum trisulfide was determined. The results of these tests are shown in Table I.

*Table I*

MOLYBDENUM CONTENT OF FILTRATE AS A FUNCTION OF NaHS ADDITION

| Percent Excess NaHS | Mo Content (g./l.) | Ratio of W/Mo in Filtrate |
| --- | --- | --- |
| 35 | 0.057 | 860 |
| 55 | 0.034 | 970 |
| 65 | 0.006 | 5,400 |
| 70 | 0.0009 | 56,000 |
| 110 | 0.0006 | 48,000 |

A typical tungsten-containing sodium carbonate leach solution contains tungsten in an amount of about 100 grams per liter expressed as tungstic oxide, molybdenum in an amount of about 4.5 grams per liter, about 120 gm./liter sodium carbonate, about 1.5 grams per liter of silicon dioxide, about 3.75 grams per liter of fluorine and trace amounts of copper, aluminum, phosphorous and other elements. Upon treatment of such solutions by the process of the present invention the molybdenum content is reduced to less than 30 parts per million and usually to 2 parts per million generally with a WO₃/Mo ratio of 1800 to 1 or greater.

After treatment of such solutions as those described immediately above, on a laboratory scale, by employing 170 percent of the stoichiometric amount of sodium sulfide required to convert the molybdenum contaminant to the thiomolybdate complex ion followed by digestion and acidification to a pH in the range of 2.1 to 2.3, filtrates of the analyses shown in Table II were obtained.

*Table II*

| Grams of Tungstic Oxide per liter | Grams of Molybdenum per liter | Tungstic Oxide/Molybdenum Ratio |
| --- | --- | --- |
| 40.8 | .0012 | 34,000 |
| 39.9 | .0012 | 33,250 |
| 40.0 | .0014 | 28,570 |
| 37.5 | .0020 | 18,750 |

To determine the effectiveness of the process of the present invention on a production scale, eight 12,000 gallon batches of substantially identical sodium carbonate leach solutions as those described above were secured and treated with greater than 170 percent of the stoichiometric amount of sodium sulfide required to convert the molybdenum contaminant to a thiomolybdate complex ion. The batches were then digested at about 85° C. and the pH was adjusted to about 2.3 to precipitate the molybdenum as molybdenum trisulfide. The molybdenum trisulfide was filtered from the solution. Samples were taken of the filtrate and the tungsten and molybdenum content was determined after treatment of each 12,000 gallon batch. The results are shown in Table III.

*Table III*

| Grams per Liter Tungstic Oxide | Grams per Liter Molybdenum | Tungstic Oxide/Molybdenum Ratio |
| --- | --- | --- |
| 31.6 | .0013 | 24,308 |
| 37.1 | .00085 | 43,647 |
| 35.5 | .0011 | 32,273 |
| 35.6 | .0013 | 27,385 |
| 34.4 | .0011 | 31,273 |
| 33.9 | .0006 | 56,500 |
| 31.8 | .00085 | 37,411 |
| 29.0 | .0011 | 26,364 |

While the foregoing discusses the present invention with sufficient particularity to permit a skilled artisan to practice the same, it is contemplated that minor variations may be made in the subject invention without departing from the spirit and scope thereof.

What is claimed is:

1. A process for selectively separating molybdenum from a molybdenum-contaminated aqueous solution of tungsten values comprising providing a molybdenum-contaminated aqueous solution of tungsten values; adjusting the pH of said solution to at least 8; adding to said solution at least 170 percent of the amount of alkali sulfide stoichiometrically required to convert the molybdenum contaminant in said solution to the thiomolybdate complex ion; digesting said solution at elevated temperature to convert the molybdenum contaminant to the thiomolybdate complex ion; acidifying said solution to a pH below about 3.0 whereby the molybdenum contaminant is precipitated; and separating the precipitate from the aqueous solution of tungsten values.

2. A process in accordance with claim 1 wherein the said pH of the molybdeunm-contaminated aqueous solution is adjusted to at least 10 prior to addition of alkali sulfide thereto.

3. A process in accordance with claim 1 wherein the alkali sulfide containing molybdenum-contaminated aqueous solution is digested at a temperature of at least 80° C.

4. A process for selectively separating molybdenum from a molybdenum-contaminated aqueous solution of tungsten values comprising providing a molybdenum-contaminated aqueous solution of tungsten values; adjusting the pH of said solution to at least 10; adding to said solution at least 170 percent of the amount of alkali sulfide stoichiometrically required to convert the molybdenum contaminant in said solution to the thiomolybdate complex ion, said alkali sulfide being at least one selected from the group consisting of sodium sulfide, sodium acid sulfide, potassium sulfide and potassium acid sulfide; digesting said solution at a temperature of about 85° C. to convert the molybdenum contaminant to the thiomolybdate complex ion; acidifying said solution to a pH below 2.3 whereby the molybdenum contaminant is precipitated; and separating the precipitate from the aqueous solution of tungsten values.

References Cited by the Examiner

UNITED STATES PATENTS 2,339,888  1/44  Smith _____ 23—18
2,556,255  6/51  Carosella _____ 23—18

OTHER REFERENCES

Hampel: "Rare Metals Handbook," Reinhold Publishing Corp., New York, 1954, pages 271–282 (page 281 of particular interest).

MAURICE A. BRINDISI, *Primary Examiner.*